US 9,487,662 B1

United States Patent
Figovsky et al.

(10) Patent No.: US 9,487,662 B1
(45) Date of Patent: Nov. 8, 2016

(54) RADIATION-CURABLE BIOBASED FLOORING COMPOSITIONS WITH NONREACTIVE ADDITIVES

(71) Applicants: POLYMATE, LTD., Migdal Ha'Emeq (IL); NANOTECH INDUSTRIES, INC., Daly City, CA (US)

(72) Inventors: Oleg Figovsky, Haifa (IL); Raisa Potashnikov, Migdal Ha'Emeq (IL); Alexander Leykin, Haifa (IL); Leonid Shapovalov, Nesher (IL); Olga Birukov, Haifa (IL)

(73) Assignees: NANOTECH INDUSTRIES, INC., Daly City, CA (US); POLYMATE, LTD., Migdal Ha'Emeq (IL)

( * ) Notice: Subject to any disclaimer, the term of this patent is extended or adjusted under 35 U.S.C. 154(b) by 193 days.

(21) Appl. No.: 14/160,297

(22) Filed: Jan. 21, 2014

(51) Int. Cl.
*C09D 7/12* (2006.01)

(52) U.S. Cl.
CPC .................... *C09D 7/1233* (2013.01)

(58) Field of Classification Search
CPC .. C08G 71/01; C08G 71/00; C08G 18/6469; C08G 18/44; C08K 5/205; C08K 5/5455; C08J 3/20; C09D 7/1233
See application file for complete search history.

(56) References Cited

U.S. PATENT DOCUMENTS

| | | | | |
|---|---|---|---|---|
| 2,802,022 A * | 8/1957 | Drechsel | C07C 271/06 | 528/367 |
| 3,092,594 A * | 6/1963 | Heiss | C08G 18/6476 | 208/22 |
| 3,277,098 A * | 10/1966 | Merten | C07D 211/70 | 524/198 |
| 3,305,527 A * | 2/1967 | Price | C08G 59/14 | 525/382 |
| 4,288,577 A * | 9/1981 | McShane, Jr. | C08G 18/10 | 252/182.26 |
| 4,720,569 A * | 1/1988 | Tominaga | C08G 59/4014 | 106/287.25 |
| 4,820,830 A * | 4/1989 | Blank | C07C 271/20 | 525/409 |
| 5,001,210 A * | 3/1991 | Coury | C08G 18/3831 | 528/85 |
| 5,134,205 A * | 7/1992 | Blank | C07C 271/20 | 525/419 |
| 5,174,813 A * | 12/1992 | Cifuentes | C09G 1/16 | 106/10 |
| 5,175,231 A * | 12/1992 | Rappoport | C08G 71/04 | 528/106 |
| 5,192,382 A * | 3/1993 | Hamura | B29D 29/10 | 156/137 |
| 5,304,628 A * | 4/1994 | Kinoshita | G03F 7/0388 | 522/100 |
| 5,340,889 A * | 8/1994 | Crawford | C07C 269/04 | 525/523 |
| 5,442,034 A * | 8/1995 | Primeaux, II | C08G 18/10 | 264/328.1 |
| 6,120,905 A * | 9/2000 | Figovsky | C08G 71/04 | 428/425.6 |
| 6,262,297 B1 * | 7/2001 | Clements | C07C 269/00 | 560/157 |
| 6,362,285 B1 * | 3/2002 | Ohrbom | C07C 271/12 | 525/162 |
| 6,407,198 B1 * | 6/2002 | Figovsky | C07D 317/36 | 528/196 |
| 6,627,761 B2 * | 9/2003 | Klein | C07C 269/02 | 549/229 |
| 6,646,153 B1 * | 11/2003 | Huybrechts | C07C 271/16 | 560/158 |
| 6,960,619 B2 * | 11/2005 | Figovsky | C08F 220/06 | 521/134 |
| 8,017,719 B2 * | 9/2011 | Bernard | C08G 71/04 | 525/462 |
| 2004/0236119 A1 * | 11/2004 | Van Holen | C07C 219/16 | 549/229 |
| 2005/0208312 A1 * | 9/2005 | Hazan | C08G 18/282 | 428/447 |
| 2006/0173140 A1 * | 8/2006 | Roesler | C08G 18/10 | 525/474 |
| 2010/0144966 A1 * | 6/2010 | Birukov | C08L 63/00 | 524/800 |
| 2010/0234497 A1 * | 9/2010 | Birukov | C08K 5/0025 | 524/108 |
| 2012/0208967 A1 * | 8/2012 | Birukov | C08L 75/04 | 525/526 |
| 2013/0079449 A1 * | 3/2013 | Childress | C08K 5/205 | 524/413 |
| 2014/0030526 A1 * | 1/2014 | Uruno | C08G 71/04 | 428/402 |
| 2014/0191156 A1 * | 7/2014 | Marks | C07D 317/40 | 252/182.23 |
| 2014/0295724 A1 * | 10/2014 | Sworen | C09D 175/06 | 442/79 |

FOREIGN PATENT DOCUMENTS

GB              146051 A1 * 7/1920

OTHER PUBLICATIONS

Figovsky et al. Recent Advances in the development of non-isocyanate polyurethanes based on cyclic carbonates. PU Magazine, vol. 10, No. 4, Aug./Sep. 2013. pp. 2-9.*

*Primary Examiner* — Sanza McClendon
(74) *Attorney, Agent, or Firm* — TransPacific Law Group; Pavel I. Pogodin, Esq.

(57) ABSTRACT

A radiation-curable composition comprising (meth)acrylic monomers and/or oligomers, photoinitiators, and a nonreactive composite additive, wherein the nonreactive composite additive comprises a) a biobased hydroxyurethane additive of formula (1):

$$R^1[-NH-COO-CR^2H-CR^3H(OH)]_2 \qquad (1)$$

wherein $R^1$ is a residue of the biobased primary diamine, and $R^2$ and $R^3$ are the same or different and are selected from the group consisting of H, alkyl, and hydroxyalkyl; and b) a silane-based hydroxyurethane additive of formula (2):

$$(R^6)_{3-n}(OR^5)_n Si-R^4-NH-COO-CR^2H-CR^3H(OH) \qquad (2)$$

wherein $R^2$ and $R^3$ are the same as stated above, $R^4$ is generally an aliphatic group having from 1 to 6 carbon atoms, $R^5$ and $R^6$, independently, are hydrocarbon radicals containing from 1 to 20 carbon atoms and selected from the group consisting of aliphatic, cycloaliphatic, and aromatic groups or combinations thereof, and n is equal to 1, 2, or 3.

14 Claims, No Drawing

RADIATION-CURABLE BIOBASED FLOORING COMPOSITIONS WITH NONREACTIVE ADDITIVES

BACKGROUND OF THE INVENTION

1. Technical Field

The present invention relates to radiation-curable compositions, preferably to flooring compositions that contain specific nonreactive additives that allow for the preparation of curable materials with desired chemical and physical properties. These nonreactive additives are not cured by exposure to radiation and do not react chemically with basic components of radiation-curable compositions. More specifically, the invention relates to radiation-curable biobased floor-covering coatings for concrete or asphalt tiles.

2. Description of the Related Art

Industrial floors are often made from concrete or asphalt tiles. Curable polymer compositions, such as epoxy, polyurethane, polyurea, and the like are often applied onto floors as protective coatings. In recent years, it became popular to protect industrial floors with radiation-curable coating materials since such coatings are strong and easy to apply.

Heretofore and still nowadays petrochemical-based raw materials remain central in the coating industry. However, due to the increasing concern about depletion of fossil reserves and greenhouse gas emissions, a large range of natural polymers and biobased plastics have been developed as ideal products to replace petroleum-based polymeric materials.

U.S. Pat. No. 3,931,075 issued on Jan. 6, 1976 to Trecker, et al, discloses amine derivatives of acrylated epoxidized soybean oil compounds that can be used by themselves or in combination with other materials to produce coatings, adhesives, or molding compositions cured by radiation.

U.S. Pat. No. 5,719,227 issued on Feb. 17, 1998 and U.S. Pat. No. 5,843,576 issued on Dec. 1, 1998 to Rosenberry, et al, describe a coating composition including a multifunctional polyurethane (meth)acrylate oligomer and floor coverings made with the coating composition and, more particularly, to radiation-curable coatings that have superior gloss retention and resistance to abrasion, gouging, and stain. It should be noted that the polyurethane fragments are incorporated directly into the crosslinked polymeric structure.

U.S. Pat. No. 8,211,967 issued on Jul. 3, 2012 to La Scala, et al, describes curable composite resins incorporating fatty acid monomers. In particular, biobased acrylated components were shown to enhance the stability, shelf life, flexibility, and strength of the composite resin. The resins incorporating methacrylated fatty acid monomers can be cured by electron beam irradiation to form a stiff and hard polymer (Example 30).

US Patent Application Publication No. 20100276059 issued on Nov. 4, 2010 by inventors D. Tian, et al, discloses a floor covering that includes a wear layer that contains a resin and a photoinitiator in which the composition of the wear layer is curable by radiation having the strongest wavelength in the UV range of 400 to 450 nm. The resin is selected from the group consisting of acrylated urethane resin, acrylated polyester resin, (meth)acrylate oligomers, (meth)acrylate monomers, N-vinyl amides, maleate esters, fumarate esters, epoxide resins, vinyl ethers, vinyl esters, allyl ethers, allyl esters, vinyl aromatics, maleimides and derivatives thereof, epoxy resins, propenyl ethers, oxetanes, lactones, thiols, unsaturated polyesters, unsaturated fatty acids, unsaturated oils, unsaturated waxes, and combinations thereof. The coating composition in the step of coating the substrate further comprises a biobased polyol crosslinker, and the photoinitiator is a cationic initiator. The gloss of the wear layer can be controlled by controlling the amount of flatting agent in the composition applied to the surface, the amount of power applied to the surface coated with the composition, or the temperature of the surface coated with the composition when the coated surface is subjected to UV radiation.

US Patent Application Publication No. 20110046257 published on Feb. 24, 2011 (inventors Webster, et al.) relates to a UV-curable coating formulation containing a siloxane-functional unsaturated polyester resin, vinyl ether functional diluents, and a photoinitiator. The invention further provides a method of preparing an article with a low surface-energy coating.

US Patent Application Publication No. 20120148833 published on Jun. 14, 2012 (inventors Cao, et al.) describes and claims colored radiation-curable coating compositions for a surface such as a concrete floor. The composition includes one or more acrylate monomers or oligomers having at least four crosslinkable double bonds, at least one photoinitiator, one or more fillers, and at least one pigment or dye. These coating compositions allow for application of coatings having a thickness of at least 0.10 mm (4 mil).

US Patent Application Publication No. 20120202909 published on Aug. 9, 2012 (inventor Chen) provides a novel UV-curable plant oil-based formulation for use on surfaces such as metal, wood, paper, textiles, and plastic. The UV-curable coating includes acrylated soybean oil, a hyper-branched acrylate, an optional adhesion promoter, and an optional renewable reactive diluent.

U.S. Pat. No. 8,420,710 issued on Apr. 16, 2013 to Tian, et al., discloses a radiation-curable biobased coating, such as a UV/EB-curable biobased coating, for flooring applications. The coating composition includes a biobased component comprising renewable and/or biobased materials. The biobased component is selected from the group consisting of a biobased resin, a biobased polyol acrylate, or a biobased polyol. The biobased component is blended with a coating formula. The coating formula includes at least one initiator. The radiation-curable biobased coating contains at least 5 wt. % of renewable materials or biobased content and may be used with a wide variety of flooring applications, such as linoleum, hardwood, laminate, cork, bamboo, resilient sheet, and tile. In this application, properties of the coatings are not disclosed and therefore their practical applicability cannot be assessed.

US Patent Application Publication No. 20130101847 published on Apr. 25, 2013 (inventors Cao, et al.) describes and claims radiation-curable coating compositions for application on surfaces such as a concrete floor. The composition includes at least one multifunctional monomer or oligomer, a polymer, at least one photoinitiator, and one or more tertiary amine compounds containing zero or one crosslinkable double bond. These coating compositions allow for application of at least 0.15 mm (6 mil) thickness of the coating composition.

US Patent Application Publication No. 20130230729 published on Sep. 5, 2013 (inventors Tian, et al.) discloses a coating composition and a floor product. The coating composition has a biobased component that includes urethane acrylate, vinyl ether, or polyester acrylate. The coating composition includes at least 5% by weight of renewable and/or biobased component. The coating composition is radiation curable and is formed by acrylating a biobased polyol acrylate and reacting the biobased polyol acrylate with polyisocyanate to form a biobased resin. The floor product includes a cellulosic substrate and a biobased coating applied to the cellulosic substrate.

US Patent Application Publication No. 201303094549 Published on Nov. 21, 2013 (inventors Vanderlip, et al.) relates to a radiation-curable composition comprising (a) from 1 to 99% by weight of a (meth)acrylated natural oil, which is the reaction product of an unsaturated natural oil with an unsaturated anhydride and a hydroxyl functional (meth)acrylate, and (b) from 1 to 99% by weight of a (meth)acrylated oligomer and/or monomer, and optionally an inert resin and/or filler, as well as their use for making inks and coatings. Inert resins are generally selected from hydrocarbon resins, acrylic resins, polyesters, chlorinated polyesters, rosin esters, phenolic resins, polyamides, styrene allyl alcohol copolymers, alkyd resins, polydiallylphthalate resins, cetonic resins, and plasticizers such as sucrose benzoate.

US Patent Application Publication No. 20130345383 A1, published on Dec. 26, 2013 (inventors Chen, et al.) describes UV-curable branched and hyperbranched oligomers and polymers that contain reactive derivatives of cashew nutshell oil, and epoxidized and/or acrylated components. The novel oligomers and polymers are suitable for use as an oil, lubricant, coating, adhesive, resin, or composite.

U.S. Pat. No. 6,960,619 issued to Figovsky, et al, on Nov. 1, 2005 discloses UV-curable liquid acrylic-based compositions (for sealing applications, which include, among other things, products of reaction of nonisocyanate urethane diols with metacrylic or acrylic anhydride).

An analogous solution in U.S. Pat. No. 7,329,773 issued to Stone, et al, on Feb. 12, 2008 discloses a process for producing carbamoyloxy (meth)acrylates that comprises transesterification of hydroxyalkyl carbamates with (meth) acrylate of formula $CH_2=CR^{29}-COOR^{30}$, wherein $R^{29}$ is hydrogen or methyl and $R^{30}$ represents an alkyl group comprising from 1 to 8 carbon atoms, in the presence of an organotitanate, an organozirconate catalyst, or an organotin catalyst. The patent also describes the carbamoyloxy (meth) acrylates thereby obtained and their use in radiation curable compositions.

U.S. Pat. No. 7,989,553 issued to Birukov, et al, on Aug. 2, 2011 discloses an epoxy-amine composition modified with a nonreactive hydroxyalkyl urethane based on petroleum-derived raw materials. US Patent Application Publication No. 20120208967 issued on Aug. 16, 2013 by inventors Figovsky, et al, describes a hybrid epoxy-urethane-amine composition that comprises a nonreactive hydroxyalkyl urethane obtained from carbonated-epoxidized unsaturated fatty acid triglycerides and a primary monoamine.

SUMMARY OF THE INVENTION

The inventive methodology is directed to advanced radiation-curable compositions, especially for flooring on the surfaces of concrete, asphalt, etc. The invention also involves extensive use of raw materials that are based on renewable resources.

The bases of the composition are (meth)acrylic monomers and oligomers, including (meth)acrylated oils and photoinitiators.

In the present invention, the term "(meth)acryl" is understood to encompass both acryl and methacryl compounds or derivatives as well as mixtures thereof.

Known methods of creating new compositions provide, as a rule, chemical modifications of the original components.

The present invention proposes use of nonreactive additives, which are not cured by radiation and do not react chemically with other components of radiation-curable compositions. At the same time, these additives contain functional groups, positively affecting the set of properties of radiation-curable compositions.

Used as an additive is a polyhydroxyurethane (nonisocyanate) composition comprising the combination of:

a) hydroxyurethane, preferably dihydroxyurethane, based on diamines of vegetable origin (formula 1):

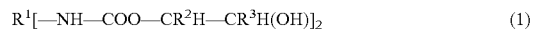

$$R^1[-NH-COO-CR^2H-CR^3H(OH)]_2 \quad (1)$$

wherein $R^1$ is a residue of the biobased primary diamine, $R^2$ and $R^3$ are the same or different and are selected from the group consisting of H, alkyl, hydroxyalkyl, and b) hydroxyurethane, preferably monohydroxyurehtane, based on aminosilanes (formula 2):

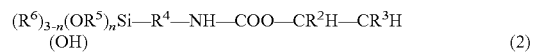

$$(R^6)_{3-n}(OR^5)_n Si-R^4-NH-COO-CR^2H-CR^3H(OH) \quad (2)$$

wherein $R^2$ and $R^3$ are the same as stated above, $R^4$ is generally an aliphatic group having from 1 to 6 carbon atoms, $R^5$ and $R^6$, independently, are hydrocarbon radicals containing from 1 to 20 carbon atoms and selected from the group consisting of aliphatic, cycloaliphatic, and aromatic groups or combinations thereof, and n is equal to 1, 2, or 3. The aforementioned additive improves a combination of properties of radiation-curable compositions, such as appearance, abrasive resistance, and adhesion to a substrate. Furthermore, without deterioration of other properties, the additive may increase the thickness of a coating that is cured in one pass.

DETAILED DESCRIPTION

Provided in accordance with one aspect of the inventive methodology is a radiation-curable composition comprising (meth)acrylic monomers and/or oligomers, photoinitiators, and a nonreactive composite additive, wherein the nonreactive composite additive consists of:

a) a biobased hydroxyurethane (nonisocyanate) additive of formula (1):

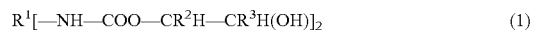

$$R^1[-NH-COO-CR^2H-CR^3H(OH)]_2 \quad (1)$$

wherein $R^1$ is a residue of the biobased primary diamine, and $R^2$ and $R^3$ are the same or different and are selected from the group consisting of H, alkyl, and hydroxyalkyl; and b) a silane-based hydroxyurethane (nonisocyanate) additive of formula (2):

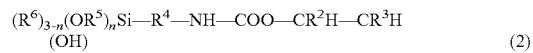

$$(R^6)_{3-n}(OR^5)_n Si-R^4-NH-COO-CR^2H-CR^3H(OH) \quad (2)$$

wherein $R^2$ and $R^3$ are the same as stated above, $R^4$ is generally an aliphatic group having from 1 to 6 carbon atoms, $R^5$ and $R^6$, independently, are hydrocarbon radicals containing from 1 to 20 carbon atoms and selected from the group consisting of aliphatic, cycloaliphatic, and aromatic groups or combinations thereof, and n is equal to 1, 2 or 3.

The biobased hydroxyurethane (nonisocyanate) additive is a reaction product of a monocyclic carbonate selected from the group consisting of ethylene carbonate, propylene carbonate, butylene carbonate, and glycerol carbonate with a biobased dimer diamine.

The silane-based hydroxyurethane (nonisocyanate) additive is a reaction product of a monocyclic carbonate selected from the group consisting of ethylene carbonate, propylene carbonate, butylene carbonate, and glycerol carbonate with aminoalkylsilane selected from the group consisting of aminoalkyl trialkoxysilanes, aminoalkyl alkyldialkoxysilanes, aminoalkyl dialkylalkoxysilanes, and aminoalkyl trialkylsilanes.

The nonreactive composite additives in the radiation-curable composition are used in an amount ranging from 1 to 30 wt. %. Thus, it is recommended that the biobased hydroxyurethane additive be used in an amount of 0.5 to 20 wt. %, and the silane-based hydroxyurethane additive in an amount of 0.5 to 20 wt. %.

The (meth)acrylic monomers and/or oligomers are selected from the group consisting of (meth)acrylic mono- and polyfunctional ethers, (meth)acrylic mono- and polyfunctional esters, (meth)acrylic mono- and polyfunctional epoxides, (meth)acrylic mono- and polyfunctional urethanes, and (meth)acrylated vegetable oils, or a mixture of the above components.

(Meth)acrylated oils that may comprise (meth)acrylic esters of soybean, linseed, canola, rapeseed oils, etc., are prepared by reacting epoxidized vegetable oils and (meth)acrylic acid. The commercially available acrylated epoxidized soybean oil used in our experiments is QualiCure™ GU 1800W (Qualipoly Chemical Corp., Taiwan).

Examples of commercially available acrylic (methacrylic) monomers and/or oligomers are Ebecryl® 893, Ebecryl® 160, Ebecryl® 154 (Allnex, Inc., GA).

Hydroxyurethane (nonisocyanate) additives of formula (1) can be prepared by reacting biobased dimer diamine with monocyclic carbonate according to the method disclosed in U.S. Pat. No. 7,989,553 of the same applicant. Cyclic carbonate (CC) and primary amine (—NH$_2$) groups are used in a ratio of 1:1 so that such additives do not contain free cyclic carbonate and amine groups.

An example of dimer diamine is Priamine™ 1071 of Croda, Inc, NJ. Examples of monocyclic carbonates are Jeffsol® EC (ethylene carbonate), Jeffsol® PC (propylene carbonate), Jeffsol® BC (butylene carbonate), and Jeffsol® GC (glycerine carbonate), all of Huntsman Corp., UT.

Hydroxyurethane (nonisocyanate) additives of formula (2) can be prepared by reacting aminosilane with monocyclic carbonate according to the method disclosed in U.S. Pat. No. 7,989,553. The functional group ratio of CC to —NH$_2$ is 1:1 so that such additives do not contain free cyclic carbonate and amine groups.

Examples of aminosilanes are Dynasylan® AMMO (3-aminopropyl trimethoxysilane), Dynasylan® AMEO (3-aminopropyl triethoxysilane), and Dynasylan® 1505 (3-aminopropyl methyl diethoxysilane), all of Evonik Industries, Germany; and SIA0603.0 (3-aminopropyl dimethyl ethoxysilane) of Gelest, Inc., PA.

Synthesis of the nonreactive hydroxyurethane additives was carried out to functional group disappearance. Consumption of the cyclic carbonate groups was controlled by spectrometer FT/IR (wavelength 1800 cm$^{-1}$). Consumption of the amino groups was controlled by FT/IR and chemical titration.

Examples of the nonreactive hydroxyurethane additives are presented in Table 1.

TABLE 1

| Additive | Raw materials | | Viscosity, |
| | Cyclic carbonate | Primary amine | 25° C., mPa · s |
| --- | --- | --- | --- |
| Priamine-PC | Jeffsol ® PC | Priamine ™ 1071 | 1200 |
| AMEO-PC | Jeffsol ® PC | Dynasylan ® AMEO | 115 |
| 1505-PC | Jeffsol ® PC | Dynasylan ® 1505 | 95 |
| AMMO-PC | Jeffsol ® PC | Dynasylan ® AMMO | 130 |

Conventional promoters (adhesion, hardness, abrasion resistance) that can be used in the composition of the invention are Ebecryl® 113, Ebecryl® 8232, DPGDA (Allnex USA Inc., GA), etc. In our application, hydroxyurethane additives play the role of promoters of adhesion, abrasion resistance, and hardness.

A photoinitiator is selected from the group comprising benzophenone and its derivatives, α-hydroxyketones, acil phosphine oxides, and their combinations. The following commercially available compounds can be used as photoinitiators: Darocur® MBF, Lucirin® Lucirin TPO-L, Irgacure® 500, Irgacure® 819 (all from BASF, CIBA, Germany), and Additol® BCPK (Allnex USA Inc., GA).

The flooring composition may further contain technological additives selected from the group consisting of defoaming, leveling, and air-releasing agents and their combinations.

Pigments such as titanium dioxide, carbon black, etc., also can be used.

The preferable content of the nonreactive composite additive in the radiation-curable flooring composition of the invention ranges from 1 to 30 wt. %.

When the additive content is less than 1 wt. %, necessary properties are not achieved. On the other hand, when the additive content exceeds 30 wt. %, the composition becomes nonhomogeneous, and its properties sharply deteriorate.

Table 2 shows the properties of biobased floorings formed from the composition of the invention on concrete compared to floorings formed from conventional compositions (the content is shown in terms of wt. %).

TABLE 2

| Composition (wt. %) | Clear topcoat (conventional) | Flooring composition of the invention | | |
| | | Flooring 1 | Flooring 2 | Flooring 3 |
| --- | --- | --- | --- | --- |
| QualiCure ® GU 1800W | — | 40.0 | 40.0 | 20.0 |
| Ebecryl ® 893 | 54.7 | 46.0 | 20.0 | 48.0 |
| Ebecryl ® 160 | 10.0 | 5.0 | 5.0 | 5.0 |
| Conventional adhesion promoters hardness, abrasion resistance | 10.0 | — | — | — |
| | 20.0 | — | — | — |

TABLE 2-continued

| Composition (wt. %) | | Clear topcoat (conventional) | Flooring composition of the invention | | |
|---|---|---|---|---|---|
| | | | Flooring 1 | Flooring 2 | Flooring 3 |
| Nonreactive composite additive | Biobased hydroxyurethane additive Priamine-PC | — | 0.5 | 20.0 | 2.0 |
| | Silane-based hydroxyurethane additive AMEO-PC | — | 0.5 | — | — |
| | Silane-based hydroxyurethane additive 1505-PC | — | — | 10.0 | — |
| | Silane-based hydroxyurethane additive AMMO-PC | — | — | — | 20.0 |
| Conventional additives (defoamer, wetting agent, flow and leveling) | | 1.0 | 1.0 | 1.0 | 1.0 |
| Photoinitiators | | 4.3 | 7.0 | 4.0 | 4.0 |
| Properties | | | | | |
| Application Temperature, ° C. | | | −18−+35 | | |
| Pot Life | | | no limitations | | |
| Cure Time (UV) | | | 30-50 sec | | |
| Total Dry Time (hours) for each layer | | | 0.5-1 | | |
| Adhesion | | 4A | 4A | 4A | 4A |
| Pencil hardness | | 4B | B | B | B |
| Hardness, Shore D | | 53 | 60 | 57 | 62 |
| Solvent resistance | | Good | Good | Good | Good |
| Gloss | | 92 | 95 | 89 | 94 |
| Abrasion resistance (mg), CS-17, 1000 grams, 1000 cycles | | 120-150 | 42 | 45 | 37 |
| Thickness applied in one layer, mm | | 0.065-0.15 | 0.065-0.8 | 0.065-0.8 | 0.065-0.8 |
| Minimum No. of layers to reach the properties declared | | 2+ | 1+ | 1+ | 1+ |

Handheld Cure System JUVC-5E (Jelight Company, Inc., CA) was used for curing.

UV cure exposure for full cure is 300 W/in.

In summary, the radiation-curable composition of the invention requires fewer coating layers in order to obtain the equivalent properties of conventional compositions.

What we claim is:

1. A radiation-curable composition comprising (meth) acrylic monomers and/or oligomers selected from the group consisting of (meth)acrylic mono- and polyfunctional ethers, (meth)acrylic mono- and polyfunctional esters, (meth) acrylic mono- and polyfunctional epoxides, (meth)acrylic mono- and polyfunctional urethanes, (meth)acrylated vegetable oils, and a mixture of the above components, photoinitiators, and a nonreactive composite additive, wherein the nonreactive composite additive comprises:

a) a biobased hydroxyurethane additive of formula (1):

$$R^1[-NH-COO-CR^2H-CR^3H(OH)]_2 \quad (1)$$

wherein $R^1$ is a residue of hydrogenated C36-fatty acid dimer diamine, and $R^2$ and $R^3$ are the same or different and are selected from the group consisting of H, alkyl, and hydroxyalkyl; and b) a silane-based hydroxyurethane additive of formula (2):

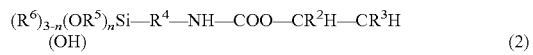

$$(R^6)_{3-n}(OR^5)_n Si-R^4-NH-COO-CR^2H-CR^3H(OH) \quad (2)$$

wherein $R^2$ and $R^3$ are the same as stated above, $R^4$ is an aliphatic group having from 1 to 6 carbon atoms, $R^5$ and $R^6$, independently, are hydrocarbon radicals containing from 1 to 20 carbon atoms and selected from the group consisting of aliphatic, cycloaliphatic, and aromatic groups or combinations thereof, and n is equal to 1, 2, or 3.

2. The radiation-curable composition of claim 1, wherein the biobased hydroxyurethane additive is the reaction product of the monocyclic carbonate selected from the group consisting of ethylene carbonate, propylene carbonate, butylene carbonate, and glycerol carbonate with a biobased diamine selected from a group consisting of C36-dimer fatty acid, diamine hydrogenated, and mixture of C36-dimer fatty acid, diamine hydrogenated with trimer fatty acid, triamine hydrogenated.

3. The radiation-curable composition of claim 1, wherein the silane-based hydroxyurethane additive is a reaction product of the monocyclic carbonate selected from the group consisting of ethylene carbonate, propylene carbonate, butylene carbonate, and glycerol carbonate with an aminoalkylsilane selected from the group consisting of aminoalkyl trialkoxysilanes, aminoalkyl alkyldialkoxysilanes and aminoalkyl dialkylalkoxysilanes.

4. The radiation-curable compositions of claim 1, wherein the nonreactive composite additive ranges from 1 to 30 wt. %.

5. The radiation-curable compositions of claim 1, wherein the biobased hydroxyurethane additive ranges from 0.5 to 20 wt. %.

6. The radiation-curable compositions of claim 1, wherein the silane-based hydroxyurethane additive ranges from 0.5 to 20% by weight.

7. The radiation-curable composition of claim 1, wherein the (meth)acrylated vegetable oil is an acrylated epoxidized soybean oil.

8. The radiation-curable composition of claim 1, wherein the (meth)acrylated vegetable oil is an acrylated epoxidized soybean oil.

9. The radiation-curable composition of claim 1, wherein the photoinitiator is selected from the group consisting of benzophenone and its derivatives, α-hydroxyketones, acil phosphine oxides, and their combinations.

10. The radiation-curable composition of claim 1, further comprising technological additives selected from the group consisting of defoaming, leveling, air-releasing agents, and their combinations.

11. The radiation-curable composition of claim 4, further comprising technological additives selected from the group consisting of defoaming, leveling, air-releasing agents, and their combinations.

12. The radiation-curable composition of claim 9, further comprising technological additives selected from the group consisting of defoaming, leveling, air-releasing agents, and their combinations.

13. The radiation-curable composition of claim 1, wherein the nonreactive composite additive ranges from 1 to 30 wt. %; the biobased hydroxyurethane additive ranges from 0.5 to 20 wt. %; and the silane-based hydroxyurethane additive ranges from 0.5 to 20% by weight.

14. The radiation-curable composition of claim 13, further comprising technological additives selected from the group consisting of defoaming, leveling, air-releasing agents, and their combinations.

\* \* \* \* \*